(12) United States Patent
Tang et al.

(10) Patent No.: US 11,004,157 B2
(45) Date of Patent: May 11, 2021

(54) XBRL-BASED INTELLIGENT FINANCIAL CLOUD PLATFORM SYSTEM, CONSTRUCTION METHOD AND BUSINESS IMPLEMENTATION METHOD THEREOF

(71) Applicant: SICHUAN CHANGHONG ELECTRIC CO., LTD., Mianyang (CN)

(72) Inventors: Jun Tang, Mianyang (CN); Dong Liu, Mianyang (CN); Yanlong Xu, Mianyang (CN); Bo Li, Mianyang (CN)

(73) Assignee: SICHUAN CHANGHONG ELECTRIC CO., LTD., Mianyang (CN)

( * ) Notice: Subject to any disclaimer, the term of this patent is extended or adjusted under 35 U.S.C. 154(b) by 167 days.

(21) Appl. No.: 16/320,698

(22) PCT Filed: Jul. 20, 2017

(86) PCT No.: PCT/CN2017/093738
§ 371 (c)(1),
(2) Date: Jan. 25, 2019

(87) PCT Pub. No.: WO2018/019176
PCT Pub. Date: Feb. 1, 2018

(65) Prior Publication Data
US 2019/0164231 A1  May 30, 2019

(30) Foreign Application Priority Data
Jul. 26, 2016 (CN) .......................... 201610594283.6

(51) Int. Cl.
*G06Q 40/00* (2012.01)
*G06Q 20/38* (2012.01)
(Continued)

(52) U.S. Cl.
CPC ......... *G06Q 40/12* (2013.12); *G06K 9/00449* (2013.01); *G06Q 20/042* (2013.01);
(Continued)

(58) Field of Classification Search
None
See application file for complete search history.

(56) References Cited

U.S. PATENT DOCUMENTS 8,601,367 B1 * 12/2013 Ritz ....................... G06Q 40/00
715/234
10,169,812 B1 * 1/2019 Bajgier .................. G06Q 40/02
(Continued)

FOREIGN PATENT DOCUMENTS

| CN | 102508860 A | 6/2012 |
|---|---|---|
| CN | 103984702 A | 8/2014 |

(Continued)

OTHER PUBLICATIONS

International Search Report for PCT/CN2017/093738, dated Nov. 9, 2017.

*Primary Examiner* — Oluseye Iwarere
(74) *Attorney, Agent, or Firm* — Caesar Rivise, PC

(57) ABSTRACT

The invention belongs to the field of cloud technology and cloud processing, it discloses an XBRL-based intelligent financial cloud platform system, provides rich accounting services for users in an efficient and convenient manner. The platform system comprises a tenant document, a document tool, an accounting tool and an administration center deployed on a server; the tenant document implements the functions such as order creation, order status query and historical order viewing; the document tool provides such cloud services as image preprocessing, element correction and total element correction; the accounting tool provides such cloud services as rule checking, simulated accounting and accounting reviewing; the administration center is used (Continued)

to provide private cloud management and operation services for financial cloud in an automated, intelligent and standardized manner, consisting of a grain center, a definition center, a construction center, a business center, a user center and an operation center. Furthermore, the invention also provides a construction method and a business implementation method corresponding to the cloud platform system, it is suitable for providing efficient and convenient accounting cloud services.

10 Claims, 1 Drawing Sheet

(51) Int. Cl.
  *G06Q 20/10* (2012.01)
  *G06K 9/00* (2006.01)
  *G06Q 20/04* (2012.01)
  *G06Q 30/04* (2012.01)
(52) U.S. Cl.
  CPC ......... *G06Q 20/102* (2013.01); *G06Q 20/389* (2013.01); *G06Q 30/04* (2013.01); *G06Q 40/00* (2013.01)

(56) References Cited

U.S. PATENT DOCUMENTS

| | | | | |
|---|---|---|---|---|
| 10,319,029 | B1* | 6/2019 | Hockey | G06Q 40/12 |
| 10,453,049 | B2* | 10/2019 | Grassadonia | G06Q 20/326 |
| 2012/0011077 | A1* | 1/2012 | Bhagat | G06Q 10/0635 |
| | | | | 705/317 |
| 2014/0013204 | A1* | 1/2014 | Theis | G06Q 40/12 |
| | | | | 715/234 |
| 2014/0040182 | A1* | 2/2014 | Gilder | G06Q 40/12 |
| | | | | 707/602 |
| 2014/0278623 | A1* | 9/2014 | Martinez | G06Q 10/06 |
| | | | | 705/7.12 |
| 2015/0156065 | A1* | 6/2015 | Grandhe | H04L 41/5054 |
| | | | | 709/224 |
| 2015/0163206 | A1* | 6/2015 | McCarthy | G06F 21/10 |
| | | | | 713/171 |
| 2015/0310188 | A1* | 10/2015 | Ford | H04L 63/0428 |
| | | | | 726/28 |
| 2016/0019636 | A1* | 1/2016 | Adapalli | H04L 47/70 |
| | | | | 705/26.62 |
| 2016/0057077 | A1* | 2/2016 | Gomatam | H04L 41/5051 |
| | | | | 709/226 |
| 2017/0318083 | A1* | 11/2017 | Ignatyev | H04L 67/1023 |
| 2018/0191867 | A1* | 7/2018 | Siebel | H04L 67/322 |
| 2018/0255160 | A1* | 9/2018 | Dooley | G06Q 30/0201 |
| 2018/0367506 | A1* | 12/2018 | Ford | H04L 63/083 |
| 2019/0222560 | A1* | 7/2019 | Ford | H04L 63/0421 |
| 2020/0067789 | A1* | 2/2020 | Khuti | G06F 16/88 |

FOREIGN PATENT DOCUMENTS

| | | |
|---|---|---|
| CN | 105224631 A | 1/2016 |
| CN | 105243582 A | 1/2016 |
| CN | 106296378 A | 1/2017 |
| WO | 2008124354 A1 | 10/2008 |

* cited by examiner

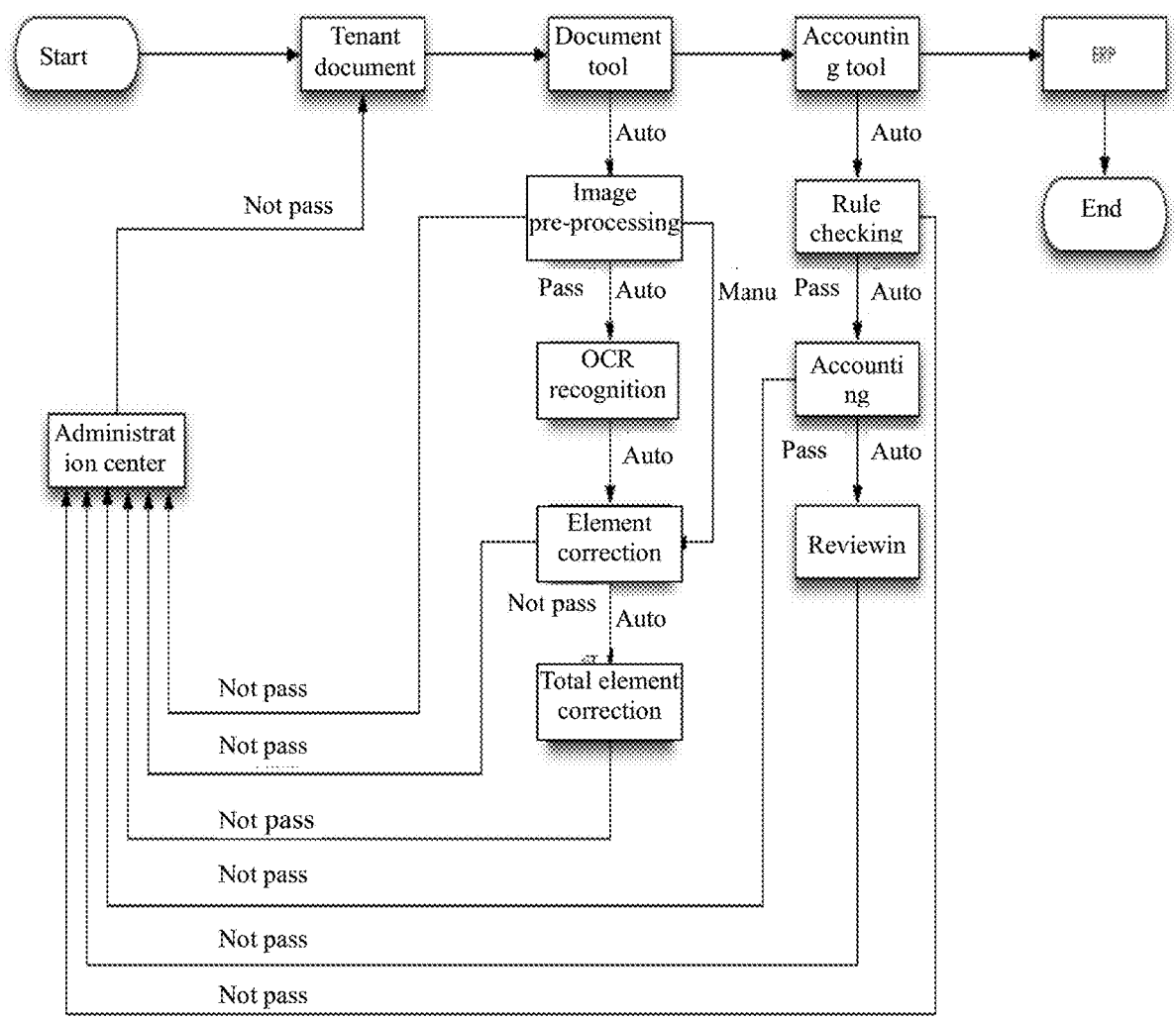

XBRL-BASED INTELLIGENT FINANCIAL CLOUD PLATFORM SYSTEM, CONSTRUCTION METHOD AND BUSINESS IMPLEMENTATION METHOD THEREOF

CROSS-REFERENCE TO RELATED APPLICATIONS

This application is a U.S. National Phase Application of PCT/CN2017/093738, filed on Jul. 20, 2017, which claims priority to CN 201610594283.6, filed Jul. 26, 2016, the contents of which applications are incorporated herein by reference in their entireties for all purposes.

TECHNICAL FIELD

The invention belongs to the field of cloud technology and cloud processing, in particular to an XBRL-based intelligent financial cloud platform system, a construction method and a business implementation method thereof.

BACKGROUND

XBRL is an XML-based (eXtensible Markup Language) open business reporting technology standard and a computer language specially used for the preparation, disclosure and application of financial report based on Internet and cross-platform operations. By adding specific tags to data in business reports such as financial and accounting reports and defining their interrelationships, a computer can "read" these reports and process them in accordance with business logic. XBRL GL is an XBRL taxonomy standard for recording transaction-level financial and non-financial details.

In terms of function expanding, Internet can better serve internal management through simultaneous integration of financial accounting and business activities, organic integration of accounting control, internal control and business processes, real-time reflection and effective monitoring of economic activities. In terms of accounting technology, the accounting work will be conducted paperless step by step, thus, based on powerful identification, analysis, comparison and summarization functions of XBRL technology, accounting information will be transformed from manual identification to computer identification, integrated from single information to system information, processed from multiple entries to one-time compilation, so as to improve the accuracy, timeliness and integration of accounting information. In terms of organizational form, the accounting work can be changed from a decentralized independent accounting mode to a centralized financial sharing mode, with the help of Internet which may promote the proper separation of accounting and business activities in physical space, and of efficient and highly integrated software systems and communication technologies. In terms of service mode, Internet platform can help change the offline business of accounting service organizations into the online business mainly, which realizes real-time accounting and real-time financial consultation, break the geographical limits of accounting services, provides more efficient and more convenient accounting services for customers, and promotes the further transformation of the management service mode of accounting management departments.

SUMMARY OF THE INVENTION

The technical problem to be solved by the invention is to provide an XBRL-based intelligent financial cloud platform system, a construction method and a service implementation method thereof, so as to provide rich accounting services for users in an efficient and convenient manner.

The invention standardizes and granulates the data based on XBRL technical standards, based on granulated standard data combined with OCR recognition technology, AI artificial intelligence technology and financial sharing concept, a flexible, highly configurable, highly intelligent and efficient financial cloud platform is designed, which is a set of intelligent financial cloud service platform system based on data standards.

The technical scheme adopted by the invention to solve the technical problem is as follows: an XBRL-based intelligent financial cloud platform system comprises a tenant document, a document tool, an accounting tool and an administration center deployed on a server; wherein, the tenant document implements the functions such as order creation, order status query and historical order viewing; the order creation requires a tenant user to select the service type and input corresponding instructions, after a document affixed with a bill is scanned and uploaded to the public cloud, the user may select a premium processing and complete the batch submission operations by ticking the corresponding service orders, the service orders returned in the accounting process are displayed in an order list, with the problem documents being marked; the said order status query allows the user to track the service orders submitted and apply for cancellation thereof; the said historical order stores the accounting service order of each tenant and the accounting voucher of the proxy account on the public cloud;

different from the cumbersome operation of other similar platform systems and the high requirement on users' accounting expertise, the tenant document enables users who have little or no professional accounting expertise to operate easily through intelligent OCR image recognition technology and intelligent semantic analysis technology. The users only need to scan/upload related document pictures such as bills for accounting, and the intelligent OCR image recognition service automatically recognizes the information on the pictures and performs intelligent semantic analysis on the information, and automatically classifies them into corresponding business types, thereby to improve the efficiency of data input;

the document tool provides such cloud services as image preprocessing, element correction and total element correction; the said image preprocessing is a process of cutting the bill by using a service order submitted by the tenant according to the document as a processing unit, the preprocessed bill is transferred to OCR for optical recognition; the said element correction is to display the bill results recognized by OCR in unit of element, correct the element values in the form of Key and Value, and add the machine learning mode and automatic completion mode to improve the element correction efficiency; the said total element correction provides total element manual correction service in unit of bill for elements that cannot be preprocessed;

the document tool uses the intelligent block diagram to identify and automatically select the document boundary, the opencv technology is used to cut the selected document into a single bill, and the intelligent OCR image recognition technology is used to accurately identify the bill, the recognition results are granulated according to XBRL technical standards. Through the concept of sharing, image preprocessing order grabbing, element correction order grabbing and total element correction order grabbing service are designed, and the service is open to the social users, thus achieving the purpose of reducing costs. The result of the correction is fed back to the intelligent OCR image recognition engine for re-learning, so as to continuously improve the recognition accuracy;

the accounting tool provides such cloud services as rule checking, simulated accounting and accounting reviewing; the said rule checking refers to the accounting and document examination service by the business type based on a service order of the tenant, the user examines a document according to the checking rule description and the associated element value of the document examination displayed, and the document examination rules and associated elements are configured by the administration center; the simulated accounting refers to automatically generating an accounting voucher according to the service order and business type of tenant, the user performs ERP accounting operation on the accounting voucher and returns the accounting voucher number, the simulated accounting voucher generation logic and accounting elements are configured in the administration center; for the service orders that cannot be processed through the financial cloud, the said accounting reviewing provides a service for reviewing a manual accounting voucher after the manual accounting is directly performed in ERP;

the accounting tool combines AI artificial intelligence technology, the element grain recognized by the document tool proceeds automatic intelligent selecting, automatic intelligent rule checking, automatic generation of accounting documents, reducing manual participation, thereby improving data processing efficiency and accuracy. At the same time, through the sharing concept, we design the grabbing service such as the rule-checking grabbing, the accounting check grabbing and simulated accounting grabbing, etc., reduce the labor cost and feed back the results of the grab processing to the AI artificial intelligence rule engine for re-learning, so as to continuously improve the automatic accounting capability. Accounting services are made very efficient through highly automated process design;

the administration center is used to provide private cloud management and operation services for financial cloud in an automated, intelligent and standardized manner, consisting of a grain center, a definition center, a construction center, a business center, a user center and an operation center;

the administration center adopts the XBRL technical standard to establish a normative and standardized element library, and standardizes the entire financial cloud platform system data through the standardized element library, at the same time, the data of the entire financial cloud platform system is granulated through this standardized element library. The administration center adopts a one-dimensional table structure to realize horizontal and vertical multi-dimensional configurability of the main data, which greatly improves the flexibility of the configuration of the financial cloud platform. Flexible configuration of inspection rules using both charting technology and granulation concepts, realize the continuous learning ability of checking rules through AI artificial intelligence technology, greatly improve the accuracy of rule configuration and automatic processing ability. The administration center can be highly matched, making the entire financial cloud platform system more flexible, the business support ability is better, and the business design is simpler;

the said grain center is the smallest grain of tenant service order data and standardizes the semantics of elements by XBRL, it is the basis for automatic rule checking, automatic accounting and ubiquitous ERP accounting in the accounting tool, it comprises a national standard element library, a GL mapping library, a bill element library, an accounting element library and a master data element library; wherein the said national standard element library stores all national standard elements; the said GL mapping library stores the GL mapping relation of the national standard elements; the said bill element library stores all bill elements, some bill elements are referenced to the national standard element library, those beyond the scope of national standard elements are expanded according to the national standard, and standardizes the semantics of elements through the XBRL GL classification standard elements; the said accounting element library stores standard accounting voucher elements, and standardizes the semantics of elements through the XBRL GL classification standard elements; the master data element library stores standard accounting master data elements, and standardizes the semantics of elements through the XBRL GL classification standard elements;

the grain center is established through a large number of financial cases combined with XBRL technical standards, making the element library suitable for various industries, achieving universal use in any industry through the scalability of XBRL technology standards. Using self-designed one-dimensional table structure to realize dynamic massive store, greatly improving element grain access efficiency;

the said definition center includes an error type definition, a task time definition, a bill template definition, a checking rule definition, an accounting logic definition, a business type definition and a bill type definition; wherein the said error type definition defines a flow node after processing an order grabbing task through the socialized crowdsourcing in a document tool and an accounting tool; the said task time definition defines the time for a socialized crowdsourcing user to complete a task; the said bill template definition defines the element contained in various types of bills, and all the elements defined in the template are referenced from the bill element library; the said checking rule definition defines the document examination rule, and realizes a high expansion configuration in the way of checking the formula, check the atomicity of the formula with the minimum checking logic as a unit, and the "true" value is output as a formula target value, and all formula elements are referenced from the bill element library; the said accounting logic definition defines an accounting voucher generation logic, a single accounting logic does not have a complete accounting voucher generation logic, and its atomicity takes the smallest accounting voucher line item as a unit; the value of a single accounting voucher element defined by the accounting logic uses the formula pattern, the value ways include fixed value, element value and calculated value, and the accounting element may be set to display in the accounting voucher; and the element defined by the accounting logic is referenced from the accounting element library and the master data element library;

the definition center uses script execution technology to achieve a clear view, simplifies configuration through charting technology, and through the natural language semantic recognition technology to achieve the rules and formulas are easy to understand, greatly reduces the threshold of configuration technology, and provides a high degree of flexibility;

the said construction center includes the construction of accounting bill relationship, accounting document examination relationship and accounting relationship; the said accounting bill relationship is to construct the relationship between the business type and the bill according to the business type, that is, all bill types that may be included in the business type are constructed as per the defined bill template; the said accounting document examination relationship is to construct the document examination rules under the business type, and to construct the logical relationship by the defined rule checking atoms; the said accounting relationship is to construct an accounting logic under the business type, that is, to generate a complete business logic of an accounting voucher, and to construct the assembly relationship with the defined accounting logic atoms;

the said business center provides tenant master data and tenant business, the said tenant master data configures the scope of master data used by the tenant, and all elements are referenced from the master data element library; the said tenant business configures all business types of the tenant cloud service, and the business types are referenced from the construction results of the construction center; the said user center includes tenant user management, crowdsourcing user management and operation user management, the financial cloud divides users into three types, namely, tenant users, crowdsourcing users and operation users; and the said user center authenticates the authority of three types of users and manages their operation behavior respectively; the said operation center provides comprehensive management and analysis services such as tenant document, document tool, accounting tool and service order, crowdsourced order grabbing task, and overall operation.

Through the self-designed one-dimensional table structure to store massive master data, combined with page technology to achieve multi-dimensional flexible configuration, the access efficiency and flexibility are greatly improved. Through the business center to unifiedly manage the master data of the entire financial cloud platform system, so as to achieve data standardization while reducing data maintenance costs.

In the above intelligent financial cloud platform system proposed by the present invention, each subsystem is independent of each other and has low coupling degree, which makes the division of labor more clear and flexible, enriches the core business, and becomes less risky. At the same time, each subsystem is functionally split based on micro-services, and combined with RPC, load balancing and other technologies to achieve distribution, use container technology for containerized multi-service deployment of cloud environment, so that the entire financial cloud platform system concurrent processing capacity, stability robustness and scalability are stronger than similar financial cloud platform systems in the prior art. Intelligent OCR recognition technology and AI artificial intelligence technology make the system more intelligent, which greatly reduces the workload of accounting services and greatly improves the efficiency and accuracy of data processing; the artificial intelligence re-learning ability makes this ability improvement become sustainability, and is more autonomous and intelligent than the similar financial cloud platform system in the prior art.

As further optimization, a tenant sandbox is designed in the tenant cloud document public cloud to ensure data security.

As further optimization, the cloud platform system establishes an accounting linking device in the grain center of its cloud center thereof by using XBRL standardized accounting voucher element semantics, wherein the accounting linking device has ubiquitous ERP capability, and a semantic relationship model between the standard accounting elements and various ERP accounting vouchers is established in the accounting linking device, so as to automatically and adaptively to account according to the ERP type of tenants.

As further optimization, the said administration center is connected to the XBRL intelligence engine (XIE), and automatically generates accounting voucher data in an XBRL format and conforming to the accounting software data interface standard according to the XBRL GL taxonomy element labels mapped by the grain center accounting element library and the master data element library used for auditing, supervision and archiving.

Furthermore, another object of the invention is to provide a business implementation method of an XBRL-based intelligent financial cloud platform system, comprising the following steps:

the service order flow threshold control is set in the order grabbing task of the document tool and the accounting tool, if the complete service order is accepted by an order grabbing task, such an order will be transferred and completed according to the following flow sequence:

Service Order-Image Preprocessing-OCR Recognition-Element Correction-Rule Checking-Simulated Accounting-Accounting Reviewing;

if an order fails to pass any node, the service order will be uniformly returned to the administration center for re-processing, including specifically, when an order fails to pass the image pre-processing, the order will be returned to the tenant document upon confirmation by the operator; if an order fails to pass the element correction, the order will be transferred automatically or manually by the operator to total element correction; if an order fails to pass the total element correction, the operator will confirm whether the order is transferred to the template for confirmation or returned to the tenant document; if an order fails to pass the rule checking, the operator will confirm whether the order is returned to the tenant document or the system will automatically transfer the order to the total element correction; if an order fails to pass the simulated accounting, the operator or system will automatically transfer the order to the total element correction, or the operator will confirm whether the order is returned to the tenant document; if an order fails to pass the accounting reviewing, the operator or system will automatically transfer the order to the simulated accounting, or the operator will confirm whether the order is returned to the tenant document.

As further optimization, the business implementation method comprises:

an emergency service strategy: a manual service line consisting of a tenant document, a document tool and an accounting tool is used for purely manual financial cloud emergency services, the automatic form provided by the tenant document, the OCR element identification provided by the document tool, the accounting logic provided by the accounting tool and the manual service line together form an intelligent financial cloud service line, and financial cloud emergency services are configured and started in the administration center.

In addition, another object of the invention is to provide a construction method of an XBRL-based intelligent financial cloud platform system, comprising the following steps:

a. establishing a tenant document public cloud service according to the accounting service order;

b. establishing a document tool public cloud service according to the documents, bills and elements of a service order;

c. establishing an accounting tool public cloud service according to the tenant service order and business type;

d. establishing an administration center private cloud service, establishing a grain center according to the accounting software data interface standard and the XBRL GL taxonomy standard, establishing a definition center and formula editor according to the grain center, establishing a construction center and a relationship between the construction center and the business center according to the definition center, establishing a user center according to user divisions, and establishing all services including the operation, monitoring and management of the operation center according to the business process;

e. establishing an intelligent automatic form service for the tenant document to implement electronic data fusion of tenant fee approval forms;

f. establishing an intelligent OCR recognition service for the document tool, and correcting errors of bills and elements after image preprocessing;

g. establishing intelligent checking rules and accounting logic for the accounting tool, accessing the automatic rule checking and automatically generating an accounting voucher;

h. allowing the administration center to establish a private cloud service of the accounting linking device, establishing a relationship model from XBRL standardized accounting element library to ERP accounting voucher elements, and adapt to various types of ERP accounting interfaces; and i. connecting the private cloud of administration center to the XBRL intelligence engine (XIE) service, and establishing an instance document service in an XBRL format that automatically generates an accounting voucher and related master data.

As further optimization, in step a, the tenant document public cloud service includes business overviewing, order creation, order status and historical order.

As further optimization, in step b, the document tool public cloud service includes user service overviewing, image pre-processing order grabbing, element correction order grabbing and total element correction order grabbing.

As further optimization, in step c, the accounting tool public cloud service includes user service overviewing, rule checking order grabbing, simulated accounting order grabbing and accounting reviewing order grabbing.

The beneficial effects of the invention are as follows: by collecting the bill (specific invoices or other business bill certificates, similarly hereinafter) elements, the XBRL-based intelligent financial cloud platform system granulates and standardizes grain semantics and values, and normalizes information exchange and sharing media by reference to XBRL GL(XBRL for Global Ledger). Thus, the XBRL global standards are deeply applied to an accounting voucher, which allows the financial cloud to flexibly output accounting vouchers and data in an XBRL format, reduces the coupling of each business unit of the platform, adapts to the ERP accounting software, and greatly improves the scalability of the platform, so as to realize the cross-enterprise and cross-regional financial data fusion and proxy accounting. Based on IaaS, PaaS, SaaS and BaaS cloud service models, a large distributed platform with PB-level data processing capacity is built from infrastructure to software level to coordinate public cloud accounting service orders, socialized crowdsourcing correction of bill elements and accounting, optical identification of private cloud bill elements and automatic accounting of various accounting software, and jointly complete the proxy accounting cloud service platform system.

Due to the adoption of intelligent OCR image recognition technology, the data collection is automated and the data collection ability is more efficient, the recognition rate of OCR image recognition has the ability to continuously improve through artificial intelligence technology to achieve data collection re-learning. Due to the adoption of the semantic analysis technology, the business applications are made simpler and closer to human habits, resulting in a better user experience. Due to the adoption of AI artificial intelligence technology, the rule checking, accounting checking and generating accounting documents are more intelligent, so that it has higher automation processing efficiency, and through the artificial intelligence re-learning ability, the continuous improvement of automation capability becomes possible, and finally realizes fully automated, the computer's processing of financial data is greatly improved. Due to the adoption of the microservice distributed architecture and the containerized deployment, the financial cloud platform system is more robust, stable, concurrent and scalable, and deployed in the cloud service environment requires less hardware resources so as to reduce operating costs.

BRIEF DESCRIPTION OF THE DRAWINGS

FIG. 1 is a business flow diagram of an intelligent financial cloud platform system based on XBRL technology in the embodiment.

DETAILED DESCRIPTION OF THE PREFERRED EMBODIMENT

The invention relates to an XBRL-based intelligent financial cloud platform system, comprising a tenant document (TD), a document tool (DT), an accounting tool (AT), and an administration center (AC), the platform is a large distributed cloud service platform with Service-oriented Architecture (SOA).

Each component is described in detail as follows:

The tenant document allows a tenant to create and manage an accounting service order in the cloud, it is serviced for public cloud, and its main functions include service order creation, order status query and historical order viewing. The order creation requires a tenant user to select the business type and input corresponding instructions, after the A4 paper (each A4 paper is called a document, similarly hereinafter) affixed with a bill is scanned and uploaded to the public cloud, the user may select a premium processing and complete the batch submission operations by ticking the corresponding service orders. The service orders returned in the accounting process are displayed in the created service order, with the problem documents being marked. The order status query allows the user to track the service orders submitted and apply for cancellation thereof. The historical order stores the accounting service order of each tenant and the accounting voucher of the proxy account on the public cloud. The public cloud of tenant document is designed with a tenant sandbox to ensure data security.

The document tool (DT) includes such cloud services as image preprocessing, element correction and total element correction. The image preprocessing is a process of cutting the bill (in order to improve the automatic cutting rate and the cutting accuracy, the document paper base color is non-white) using a service order submitted by the tenant according to the document as a processing unit, the preprocessed bill is transferred to OCR for optical recognition; the element correction is to display the bill results recognized by OCR in unit of element, correct the element values in the form of Key and Value (the workload of correcting elements is inversely proportional to the OCR recognition accuracy, that is, the higher the OCR recognition accuracy is, the lower the correction amount of elements is.), and add the machine learning mode and automatic completion mode to improve the element correction efficiency; the total element correction provides total element manual correction service in unit of bill for elements that cannot be preprocessed.

The accounting tool (AT) provides such cloud services as rule checking, simulated accounting and accounting reviewing. The rule checking refers to the accounting and document examination service by the business type based on a service order of the tenant, the user examines a document according to the checking rule description and the associated element value of the document examination displayed, and the document examination rules and associated elements are configured by the administration center (AC); the simulated accounting refers to automatically generating an accounting voucher according to the service order and business type of tenant, the user performs ERP accounting operation on the accounting voucher and returns the accounting voucher number, the simulated accounting voucher generation logic and accounting elements are configured in the administration center (AC). For the service orders that cannot be processed through the financial cloud, the accounting reviewing provides a service for reviewing a manual accounting voucher after the manual accounting is directly performed in ERP.

The document tool (DT) and the accounting tool (AT) include such functions as image preprocessing, element correction, total element correction, rule checking, simulated accounting, and accounting reviewing, which provide socialized crowdsourcing services for the order grabbing pool at a PC terminal and a mobile terminal, the order grabbing users of simulated accounting and accounting reviewing can view the entire service order. The specific user is limited with standard time and release time for completing a task in the order grabbing process, a warning prompt will be given when it exceeds the standard time, and the system will automatically release the task when it exceeds the release time. The order grabbing pool includes an automatic task pool and an order grabbing task pool, tasks that cannot be processed by the automatic task pool are pushed to the order grabbing task pool, and the crowdsourcing user automatically pushes out the current order grabbing task and locks it after completing the current order grabbing task. Task completion is uniformly judged by "pass" and "fail", wherein if failed, the user must select the specific reason to make the service order flow to the next node for processing. In order to ensure the security of tenant service order data, simulated accounting and accounting reviewing can appropriately narrow the scope of crowdsourcing users.

The administration center (AC), as the core of the system, is used to provide private cloud management and operation services for financial cloud in an automated, intelligent and standardized manner, consisting of a grain center, a definition center, a construction center, a business center, a user center and an operation center. The grain center includes a national standard element library and a GL mapping library according to *Accounting Software Data Interface, Part 1: Enterprise*, as well as a bill element library, an accounting element library and a master data element library. The national standard element library stores all national standard elements, and the national standard GL element mapping library stores GL mapping relationships of national standard elements; the bill center stores all bill elements, some bill elements are referenced to the national standard element library, and those beyond the scope of national standard elements are expanded according to the national standard, and the XBRL GL classification standard elements are used to standardize the element semantics; the accounting element library stores standard accounting voucher elements, and standardizes the semantics of elements through the XBRL GL classification standard elements; the master data element library stores standard accounting master data elements, and standardizes the semantics of elements through the XBRL GL classification standard elements; the grain center is the smallest grain of tenant service order data and standardizes the semantics of elements by XBRL, it is the basis for automatic rule checking, automatic accounting and ubiquitous ERP accounting in the accounting tool.

The definition center comprises includes a business type definition, a bill type definition, an error type definition, a task time definition, a bill template definition, a checking rule definition and an accounting logic definition, the error type definition defines a flow node after processing an order grabbing task through the socialized crowdsourcing in a document tool (DT) and an accounting tool (AT); the task time definition defines the time for a socialized crowdsourcing user to complete a task; the bill template defines the element contained in various types of bills, and all the elements defined in the template are referenced from the bill element library; the rule checking defines the document examination rules and implements high-scalability configuration in the form of formula, such as checking formula "invoice page has an accounting page" and using operation words such as "has" as keywords for a formula; the minimum checking logic is taken as a unit in terms of atomicity, and the checking formula outputs the "true" value as the target value; all formula elements are referenced from the bill element library. The accounting logic defines an accounting voucher generation logic, a single accounting logic does not have a complete accounting voucher generation logic, and its atomicity takes the smallest accounting voucher line item as a unit, for example, "debit cash payment" is a single accounting logic definition; the formula pattern is used to obtain the value of a single accounting voucher element defined by the accounting logic, which is similar to the rule checking formula, the value ways include fixed value, element value and calculated value, meanwhile, the accounting element may be displayed in the accounting voucher; the element defined by the accounting logic is referenced from the accounting element library and the master data element library.

The construction center includes the construction of accounting bill relationship, accounting document examination relationship and accounting relationship. The accounting bill relationship is to construct the relationship between the business type and the bill according to the business type, for example "domestic travel quota reimbursement", that is, all bill types that may be included in the business type are constructed as per the defined bill template. The accounting document examination relationship is to construct the document examination rules under the business type, for example "domestic travel quota reimbursement", and to construct the logical relationship by the defined rule checking atoms; the accounting relationship is to construct an accounting logic under the business type, for example "domestic travel quota reimbursement", that is, to generate a complete business logic of an accounting voucher, and to construct the assembly relationship with the defined accounting logic atoms. The construction center also provides an overall view of building the business type.

The business center includes tenant master data and tenant service, the tenant master data configures the scope of master data used by the tenant, and all elements are referenced from the master data element library. The tenant service configures all business types of the tenant cloud service, and the business types are referenced from the construction results of the construction center. The user center includes tenant user management, crowdsourcing user management and operation user management, the financial cloud divides users into three types, namely, tenant users, crowdsourcing users and operation users, and the user center authenticates the authority of three types of users and manages their operation behavior respectively. The operation center provides comprehensive management and analysis services such as tenant document, document tool, accounting tool and service order, crowdsourced order grabbing task, and overall operation.

The invention provides an XBRL-based intelligent financial cloud platform system, wherein the accounting linking device has ubiquitous ERP capability, based on the accounting element semantics standardized by XBRL through the particle center under the cloud center, a semantic relationship model between the standard accounting elements and various ERP accounting vouchers is established in the accounting linking device, for example, mapping of SAP and Orcale accounting voucher elements to XBRL accounting elements, and the accounting linking device can automatically adapt to accounting according to the ERP type of tenants.

The administration center (AC) is connected to the XBRL Intelligence Engine (XIE), and automatically generates accounting voucher data in an XBRL format and conforming to *Accounting Software Data Interface, Part* 1: *Enterprise,* according to the XBRL GL taxonomy element labels mapped by the grain center accounting element library and the master data element library for auditing, supervision and archiving.

Embodiment 1

Based on the implementation scheme of constructing the above intelligent financial cloud platform system, this embodiment includes the following implementation steps:

step 1: establishing a tenant document (TD) public cloud service according to the accounting service order, including business overviewing, order creation, order status and historical order;

step 2: establishing a document tool (DT) public cloud service according to the documents, bills and elements of a service order, including user service overviewing, image pre-processing order grabbing, element correction order grabbing and total element correction order grabbing;

step 3: establishing an accounting tool (AT) public cloud service according to the tenant service order and business type, including user service overviewing, rule checking order grabbing, simulated accounting order grabbing and accounting reviewing order grabbing;

step 4: establishing an administration center (AC) private cloud service, establishing a grain center according to *Accounting Software Data Interface, Part* 1: *Enterprise* and the XBRL GL taxonomy standard, establishing a definition center and formula editor according to the grain center, establishing a construction center and a relationship between the construction center and the business center according to the definition center, establishing a user center according to user divisions, and establishing all services including the operation, monitoring and management of the operation center according to the business process;

step 5: establishing an intelligent automatic form service for the tenant document to implement electronic data fusion of tenant fee approval forms;

step 6: establishing an intelligent OCR recognition service for the document tool (DT), and correcting errors of bills and elements after image preprocessing;

step 7: establishing intelligent checking rules and accounting logic for the accounting tool (AT), accessing the automatic rule checking and automatically generating an accounting voucher;

step 8: allowing the administration center (AC) to establish a private cloud service of the accounting linking device, establishing a relationship model from XBRL standardized accounting element library to ERP accounting voucher elements, and adapt to various types of ERP accounting interfaces; and step 9: connecting the private cloud of administration center (AC) to the XBRL Intelligence Engine (XIE) service, and establishing an instance document service in an XBRL format that automatically generates an accounting voucher and related master data.

Embodiment 2

The business flow of the XBRL-based intelligent financial cloud platform system in the embodiment of the invention is shown in FIG. 1, and the main flow includes service order-image preprocessing-OCR identification-element correction-rule checking-simulated accounting-accounting reviewing. Four configurable flow nodes are designed, namely, service order, total element correction, template confirmation (confirmation of bill template definition) and simulated accounting, which are transferred and processed manually or automatically. The service order flow threshold control is set in the order grabbing task of the document tool (DT) and the accounting tool (AC), if the complete service order is accepted by an order grabbing task, each flow node will be transferred and completed according to the main flow sequence. If an order fails to pass any node, the service order will be uniformly returned to the administration center (AC) for re-processing, specifically, when an order fails to pass the image pre-processing, the order will be returned to the tenant document (TD) upon confirmation by the operator; if an order fails to pass the element correction, the order will be transferred automatically or manually by the operator to total element correction; if an order fails to pass the total element correction, the operator will confirm whether the order is transferred to the template for confirmation or returned to the tenant document (TD); if an order fails to pass the rule checking, the operator will confirm whether the order is returned to the tenant document (TD) or the system will automatically transfer the order to the total element correction; if an order fails to pass the simulated accounting, the operator or system will automatically transfer the order to the total element correction, or the operator will confirm whether the order is returned to the tenant document (TD); if an order fails to pass the accounting reviewing, the operator or system will automatically transfer the order to the simulated accounting, or the operator will confirm whether the order is returned to the tenant document (TD).

The XBRL-based intelligent financial cloud platform system of the invention comprises an emergency service strategy, wherein a manual service line consisting of a tenant document (TD), a document tool (DT) and an accounting tool (AT) is used for purely manual financial cloud emergency services, and the automatic form provided by the tenant document (TD), the OCR element identification provided by the document tool (DT), the intelligent accounting logic provided by the accounting tool (AT) and the manual service line together form an intelligent financial cloud service line. Financial cloud emergency services are configured and started in the administration center (AC).

The invention claimed is:

1. An XBRL-based intelligent financial cloud platform system, characterized by comprising a tenant document, a document tool, an accounting tool and an administration center deployed on a server; wherein, the tenant document implements the functions such as order creation, order status query and historical order viewing; the order creation requires a tenant user to select the service type and input corresponding instructions, after a document affixed with a bill is scanned and uploaded to the public cloud, the user may select a premium processing and complete the batch submission operations by ticking the corresponding service orders, the service orders returned in the accounting process are displayed in an order list, with the problem documents being marked; the order status query allows the user to track the service orders submitted and apply for cancellation thereof; the historical order stores the accounting service order of each tenant and the accounting voucher of the proxy account on the public cloud;

the document tool provides such cloud services as image preprocessing, element correction and total element correction; the image preprocessing is a process of cutting the bill using a service order submitted by the tenant according to the document as a processing unit, the preprocessed bill is transferred to OCR for optical recognition; the element correction is to display the bill results recognized by OCR in unit of element, correct the element values in the form of Key and Value, and add the machine learning mode and automatic completion mode to improve the element correction efficiency; the total element correction provides manual total element correction service in unit of bill for elements that cannot be preprocessed;

the accounting tool provides such cloud services as rule checking, simulated accounting and accounting reviewing; the rule checking refers to the accounting and document examination service by the business type based on a service order of the tenant, the user examines a document according to the checking rule description and the associated element value of the document examination displayed, and the document examination rules and associated elements are configured by the administration center; the simulated accounting refers to automatically generating an accounting voucher according to the service order and business type of tenant, the user performs ERP accounting operation on the accounting voucher and returns the accounting voucher number, the simulated accounting voucher generation logic and accounting elements are configured in the administration center; for the service orders that cannot be processed through the financial cloud, the accounting reviewing provides a service for reviewing a manual accounting voucher after the manual accounting is directly performed in ERP;

the administration center is used to provide private cloud management and operation services for financial cloud in an automated, intelligent and standardized manner, consisting of a grain center, a definition center, a construction center, a business center, a user center and an operation center;

the grain center is the smallest grain of tenant service order data and standardizes the semantics of elements by XBRL, it is the basis for automatic rule checking, automatic accounting and ubiquitous ERP accounting in the accounting tool, it comprises a national standard element library, a GL mapping library, a bill element library, an accounting element library and a master data element library; wherein the national standard element library stores all national standard elements; the GL mapping library stores the GL mapping relation of the national standard elements; the bill element library stores all bill elements; some bill elements are referenced to the national standard element library, those beyond the scope of national standard elements are expanded according to the national standard, and standardizes the semantics of elements through the XBRL GL classification standard elements; the accounting element library stores standard accounting voucher elements, and standardizes the semantics of elements through the XBRL GL classification standard elements; the master data element library stores standard accounting master data elements, and standardizes the semantics of elements through the XBRL GL classification standard elements; the definition center includes an error type definition, a task time definition, a bill template definition, a checking rule definition, an accounting logic definition, a business type definition and a bill type definition; wherein the error type definition defines a flow node after processing an order grabbing task through the socialized crowdsourcing in a document tool and an accounting tool; the task time definition defines the time for a socialized crowdsourcing user to complete a task; the bill template definition defines the element contained in various types of bills, and all the elements defined in the template are referenced from the bill element library; the checking rule definition defines the document examination rule, and realizes a high expansion configuration in the way of checking the formula, check the atomicity of the formula with the minimum checking logic as a unit, and the "true" value is output as a formula target value, and all formula elements are referenced from the bill element library; the accounting logic definition defines an accounting voucher generation logic, a single accounting logic does not have a complete accounting voucher generation logic, and its atomicity takes the smallest accounting voucher line item as a unit, a formula pattern is used to obtain the value of a single accounting voucher element defined by the accounting logic, the value ways include fixed value, element value and calculated value, meanwhile, the accounting element may be set to display in the accounting voucher; and the element defined by the accounting logic is referenced from the accounting element library and the master data element library;

the construction center includes the construction of accounting bill relationship, accounting document examination relationship and accounting relationship, the accounting bill relationship is to construct the relationship between the business type and the bill according to the business type, that is, all bill types that may be included in the business type are constructed as per the defined bill template; the accounting document examination relationship is to construct the document examination rules under the business type, and to construct the logical relationship by the defined rule checking atoms; the accounting relationship is to construct an accounting logic under the business type, that is, to generate a complete business logic of an accounting voucher, and to construct the assembly relationship with the defined accounting logic atoms;

the business center provides tenant master data and tenant business, the tenant master data configures the scope of master data used by the tenant, and all elements are referenced from the master data element library; the tenant business configures all business types of the tenant cloud service, and the business types are referenced from the construction results of the construction center; the user center includes tenant user management, crowdsourcing user management and operation user management, the financial cloud divides users into three types, namely, tenant users, crowdsourcing users and operation users, and the user center authenticates the authority of three types of users and manages their operation behavior respectively; the operation center provides comprehensive management and analysis services such as tenant document, document tool, accounting tool and service order, crowdsourced order grabbing task, and overall operation.

2. The XBRL-based intelligent financial cloud platform system according to claim 1, characterized in that a tenant sandbox is designed in the tenant document public cloud to ensure data security.

3. The XBRL-based intelligent financial cloud platform system according to claim 1, characterized in that the cloud platform system establishes an accounting linking device in the grain center of its administration center thereof by using XBRL standardized accounting voucher element semantics, wherein the accounting linking device has ubiquitous ERP capability, and a semantic relationship model between the standard accounting elements and various ERP accounting vouchers is established in the accounting linking device, so as to automatically and adaptively account according to the ERP type of tenants.

4. The XBRL-based intelligent financial cloud platform system according to claim 1, characterized in that the administration center is connected to the XBRL intelligence engine (XIE), and automatically generates accounting voucher data in an XBRL format and conforming to the accounting software data interface standard according to the XBRL GL taxonomy element labels mapped by the grain center accounting element library and the master data element library used for auditing, supervision and archiving.

5. A business implementation method of an XBRL-based intelligent financial cloud platform system, characterized by comprising the following steps:

setting a service order flow threshold control in the order grabbing task of the document tool and the accounting tool;

transferring and completing a complete service order that is accepted by an order grabbing task according to the following flow node sequence:

Service Order—Image Preprocessing—OCR Recognition—Element Correction—Rule Checking—Simulated Accounting—Accounting Reviewing; and returning the accepted complete service order to an administration center or reprocessing responsive to failure of the accepted complete service order to pass any flow node of the flow node sequence, the returning including:

returning the accepted complete service order a tenant document responsive to failure of the accepted complete service order to pass the image pre-processing and confirmation by an operator, transferring the accepted complete service order to total element correction responsive to failure of the accepted complete service order to pass the element correction, transferring the accepted compete service order to one of the template for confirmation and the tenant document responsive to failure of the accepted complete service order to pass the total element correction, transferring the accepted complete service order to one of the tenant document and the total element correction responsive to failure of the accepted complete service order to pass the rule checking, transferring the accepted complete service order to the one of the total element correction and the tenant document responsive to failure of the accepted complete service order to pass the simulated accounting and transferring the accepted compete service order to one of the simulated accounting and the tenant document responsive to failure of the accepted complete service order to pass the accounting reviewing.

6. The business implementation method of the XBRL-based intelligent financial cloud platform system according to claim 5, characterized by comprising:

an emergency service strategy: a manual service line consisting of a tenant document, a document tool and accounting tool is used for purely manual financial cloud emergency services, the automatic form provided by the tenant document, the OCR element identification provided by the document tool, the accounting logic provided by the accounting tool and the manual service line together form an intelligent financial cloud service line, and financial cloud emergency services are configured and started in the administration center.

7. A construction method of an XBRL-based intelligent financial cloud platform system, characterized by comprising the following steps:

a. establishing a tenant document public cloud service according to the accounting service order;

b. establishing a document tool public cloud service according to the documents, bills and elements of a service order;

c. establishing an accounting tool public cloud service according to the tenant service order and business type;

d. establishing an administration center private cloud service, establishing a grain center according to the accounting software data interface standard and the XBRL GL taxonomy standard, establishing a definition center and formula editor according to the grain center, establishing a construction center and a relationship between the construction center and the business center according to the definition center, establishing a user center according to user divisions, and establishing all services including the operation, monitoring and management of the operation center according to the business process;

e. establishing an intelligent automatic form service for the tenant document to implement electronic data fusion of tenant fee approval forms;

f. establishing an intelligent OCR recognition service for the document tool, and correcting errors of bills and elements after image preprocessing;

g. establishing intelligent checking rules and accounting logic for the accounting tool, accessing the automatic rule checking and automatically generating an accounting voucher;

h. allowing the administration center to establish a private cloud service of the accounting linking device, establishing a relationship model from XBRL standardized accounting element library to ERP accounting voucher elements, and adapt to various types of ERP accounting interfaces; and i. connecting the private cloud of administration center to the XBRL intelligence engine (XIE) service, and establishing an instance document service in an XBRL format that automatically generates an accounting voucher and related master data.

8. The construction method of the XBRL-based intelligent financial cloud platform system according to claim 7, characterized in that in step a, the tenant document public cloud service includes business overviewing, order creation, order status and historical order.

9. The construction method of the XBRL-based intelligent financial cloud platform system according to claim 8, characterized in that in step b, the document tool public cloud service includes user service overviewing, image pre-processing order grabbing, element correction order grabbing and total element correction order grabbing.

10. The construction method of the XBRL-based intelligent financial cloud platform system according to claim 8, characterized in that in step c, the accounting tool public cloud service includes user service overviewing, rule checking order grabbing, simulated accounting order grabbing and accounting reviewing order grabbing.

\* \* \* \* \*